United States Patent [19]

Moschini

[11] Patent Number: 4,782,872
[45] Date of Patent: Nov. 8, 1988

[54] COVER FOR STEERING WHEELS

[75] Inventor: Franco Moschini, Tolentino, Italy

[73] Assignee: Poltrona Frau S.p.A., Tolentino, Italy

[21] Appl. No.: 66,768

[22] Filed: Jun. 25, 1987

[30] Foreign Application Priority Data

Jun. 27, 1986 [IT] Italy ............................. 22410/86[U]

[51] Int. Cl.[4] .......................... B62D 1/06; B65D 65/08
[52] U.S. Cl. .................................. 150/52 M; 74/558; 150/52 K
[58] Field of Search ............... 150/52 K, 52 L, 52 M, 150/54 A, 54 B, 128, 146; 190/126; 383/107; 74/558, 558.5

[56] References Cited

U.S. PATENT DOCUMENTS

| | | | |
|---|---|---|---|
| 1,168,146 | 1/1916 | Barnes | 150/52 M |
| 1,641,311 | 9/1927 | Barrett et al. | 150/52 M |
| 1,978,105 | 10/1934 | Flanagan | 74/558 |
| 2,058,740 | 10/1936 | Summers | 150/52 M X |
| 2,309,374 | 1/1943 | Alexander | 74/558 |
| 3,312,124 | 4/1967 | Meier et al. | 74/558 |
| 3,530,739 | 9/1970 | Meier | 74/558 X |
| 4,179,950 | 12/1979 | Valley | 150/52 M X |

FOREIGN PATENT DOCUMENTS 516269 12/1939 United Kingdom .................. 74/558

Primary Examiner—William Price
Assistant Examiner—Sue A. Weaver
Attorney, Agent, or Firm—Peter K. Kontler

[57] ABSTRACT

A cover for the steering wheel of a motor vehicle, a motor boat or another conveyance has an annular body of leather or the like with an annular slot. The marginal portions of the annular body along the slot are doubled so that they comprise inner and outer layers which are integral with one another adjacent the slot and are secured to each other by one or more rows of stitches. Rows of relatively long stitches are provided in regions where the overlapping layers of the marginal portions are integral with each other, and a lace is used to connect the long stitches on one marginal portion with the long stitches on the other marginal portion. The lace can be caused to assume an undulate shape, particularly a zig-zag formation, and can be tightened as strongly as desired to narrow the slot or to reduce the width of the slot to zero.

12 Claims, 1 Drawing Sheet

COVER FOR STEERING WHEELS

BACKGROUND OF THE INVENTION

The invention relates to covers for steering wheels or the like.

Covers for steering wheels of motor vehicles normally consist of genuine or imitation leather, textile, a plastic material or a combination of the just enumerated and/or other materials. As a rule, the cover includes an annular body (because the steering wheel of a motor vehicle is normally a circumferentially complete ring) which is made of a strip of suitable flexible material and is placed around the steering wheel so that the two longitudinally extending marginal portions of the strip are adjacent each other within the confines of the steering wheel, i.e., in the region of the minimum-diameter portion of the steering wheel. Such marginal portions are then secured to each other. The making of the strip, its application to the steering wheel and the attachment of the marginal portions of the strip to each other (to thus convert the strip into a tube) are time-consuming operations, especially the attachment of marginal portions of the strip to one another. The situation is aggravated because at least the last-mentioned step must be carried out while the strip surrounds the steering wheel. The inner side of the steering wheel is not readily accessible to a workman, to a machine or to a tool.

Proposals to simplify the conversion of a strip into a tubular body which surrounds the steering wheel include the making of holes in the marginal portions of the strip and the utilization of a lace which is threaded through the holes not unlike a shoelace. The lace can constitute a yarn, a thread, a cord or the like. For example, the lace can be made of the same material as the strip. A drawback of this proposal is that the holes weaken the marginal portions of the strip and shorten the useful life of the cover. Moreover, the holes are not readily accessible because their inner ends are immediately adjacent the surface of the steering wheel. Therefore, the introduction of a lace into the holes is a tedious and time-consuming operation. It has been found that the appearance of a cover which employs a lace and holes in the marginal portions of the strip is not satisfactory. Still further, those portions of the lace which pass through the holes form bulges which detract from the appearance of the cover and are uncomfortable to the hands of the person grasping the cover. All in all, the aforedescribed covers failed to gain widespread acceptance by the drivers of automobiles and of other types of conveyances.

OBJECTS AND SUMMARY OF THE INVENTION

An object of the invention is to provide a steering wheel cover which is of eye-pleasing appearance, which is comfortable to the hand or hands of the user, and which can be assembled and installed within a short interval of time.

Another object of the invention is to provide a cover wherein the slot between the marginal portions of the converted strip can be concealed to a desired extent without unduly weakening the body of the cover and/or shortening the useful life of the cover.

A further object of the invention is to provide a cover which can be applied to a steering wheel in a simple operation that can be performed manually or with a machine.

An additional object of the invention is to provide a novel and improved method of making and applying the above outlined cover.

Another object of the invention is to provide a cover wherein the marginal portions of the converted strip can be laced together without the need for any openings in the marginal portions, i.e., without the lace passing through the material of the converted strip.

A further object of the invention is to provide a cover in which the region where the marginal portions of the converted strip are adjacent one another does not develop bulges which are uncomfortable to the hand or hands and/or detract from the appearance of the cover.

Another object of the invention is to provide a cover which can be grasped by hands without slippage.

Still another object of the invention is to provide a cover which can surround a steering wheel or another substantially circular, oval or polygonal object to any desired extent and wherein the extent of overlap with the surface of the steering wheel can be altered as desired.

The invention is embodied in a tubular cover, particularly for use as a covering for the steering wheel of a motor vehicle, a boat or another conveyance. The cover comprises an annular or nearly annular (e.g., C-shaped) body of leather or other flexible material, and the body has an annular slot and includes two marginal portions which bound the slot. A row of stitches is provided on each marginal portion along the slot, and a lace is employed to lace the marginal portions together. To this end, the lace is interlocked with the stitches of the two rows. Thus, the stitches can be said to form eyelets for the lace. The rows of stitches preferably include relatively long stitches extending in the longitudinal direction of the respective marginal portions.

At least one marginal portion is preferably doubled, i.e., it comprises two overlapping layers which are integral with each other adjacent the slot, and additional stitches are preferably provided to connect the overlapping layers of the one marginal portion to each other in such a way that the respective row of long stitches is disposed between the additional stitches and the slot. The additional stitches can form one or more rows which are parallel or nearly parallel to the slot. The slot is preferably located in the region of the minimum-diameter portion of the annular body. The mutually inclined portions of the lace can impart to the lace a substantially undulate shape; they are preferably arranged in zig-zag formation.

The long stitches are, or can be, immediately adjacent the slot. Thus, if the marginal portions comprise pairs of overlapping layers and such layers have portions which are immediately adjacent the slot and are integral with each other, the long stitches are or can be provided in such integrally connected portions of the respective pairs of overlapping layers.

The material of the lace can be the same as that of the annular body, and the lace can be applied so tightly that the width of the slot is minimal or is reduced to zero, i.e., the marginal portions of the annular body can actually touch or even slightly overlap each other.

The novel features which are considered as characteristic of the invention are set forth in particular in the appended claims. The improved cover itself, however, both as to its construction and the mode of making and mounting the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
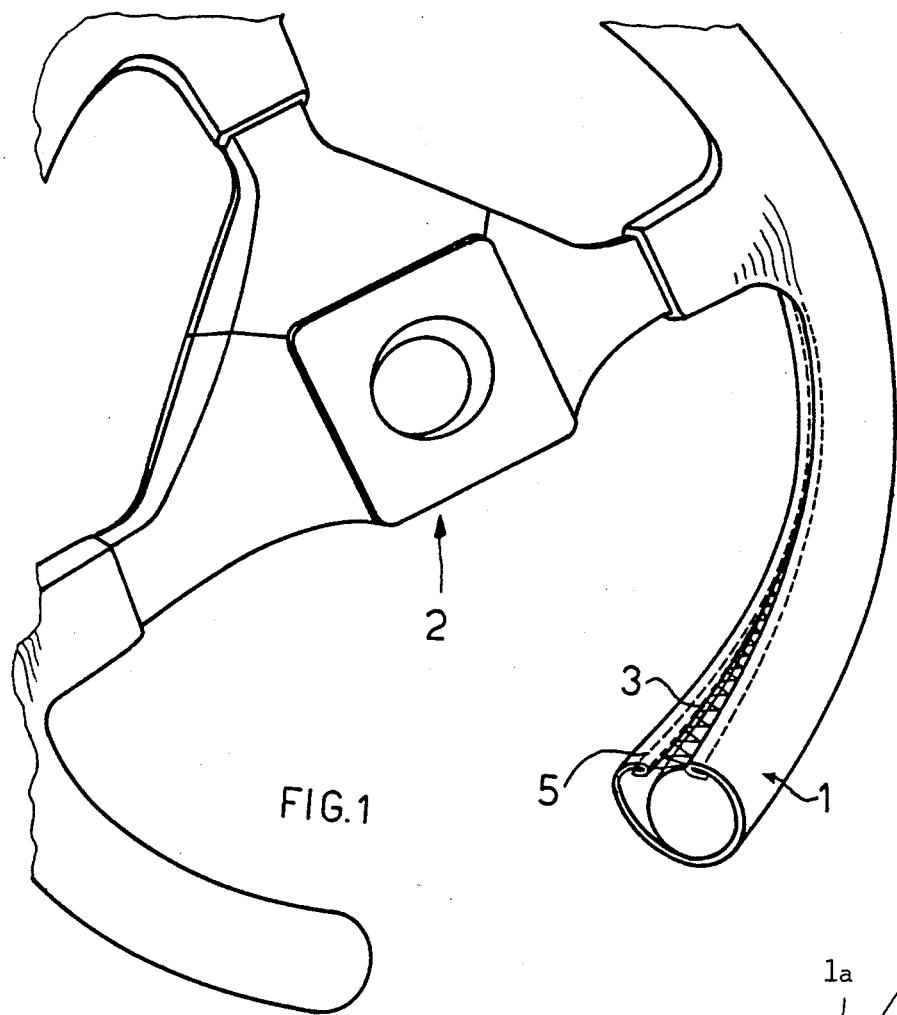
FIG. 1 is a fragmentary perspective view of a steering wheel and of a portion of a cover which embodies the invention.
Figure 2:
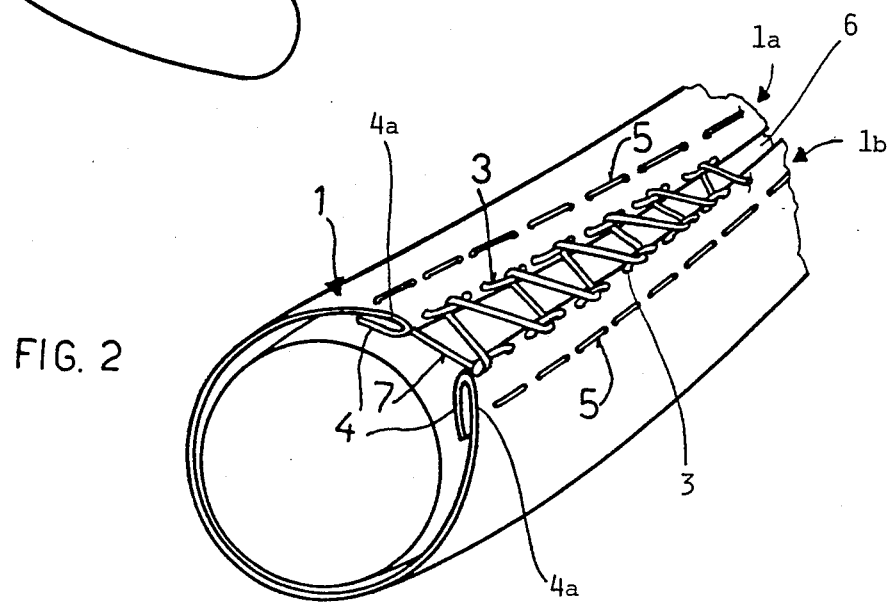
FIG. 2 is an enlarged perspective view of details of the steering wheel and cover of FIG. 1.

FIG. 1 shows a portion of a steering wheel 2 and a cover including an annular or substantially annular (e.g., C-shaped) body 1 consisting of a flexible elastic material, e.g., genuine leather, textile material, synthetic plastic material (including artificial leather) or the like. The body 1 is a converted strip having two elongated marginal portions 1a and 1b (see FIG. 2) which define a slot or gap 6. The length of the body 1 suffices to completely surround the wheel 2, and the slot 6 is preferably provided in or is adjacent the minimum-diameter portion of the body 1, i.e., it is surrounded by the steering wheel. The ends of the body 1 are connected to each other in a manner not forming part of the invention (for example, such ends can be connected to each other by stitches, not shown).

Each of the marginal portions 1a and 1b consists of two overlapping layers 4, 4A which are secured to each other by a row of stitches 5. Those parts of the layers 4, 4a which are immediately adjacent the slot 6 are integral with each other and are provided with rows of long stitches 3 which can be said to form eyelets for a lace 7. The material of the stitches 3 may but need not be the same as that of the stitches 5, and at least the stitches are made by using a very strong thread of a textile or synthetic plastic material.

The stitches 5 are optional but desirable; they ensure that the layers 4a will accurately overlie the respective layers 4. The inner layers 4 are fully concealed when the cover including the body 1 is properly applied to the steering wheel 2. If desired, the layers 4a can be bonded to the respective layers 4.

The application of stitches 5 can precede or follow the application of stitches 3. The strip carrying the stitches 3 and 5 is then applied to the steering wheel 2, and the lace 7 is threaded through the eyelets which are formed by the stitches 3 and is tensioned so as to narrow the slot 6 or to reduce the width of the slot to zero. The lace 7 can be caused to assume an undulate shape; as shown, its portions are arranged in zig-zag formation. Since the lace 7 need not extend through the material of the body 1, the thickness of such body in the region of the slot 6 does not appreciably exceed the thickness of its major portion. This is desirable and advantageous because it enhances the appearance of the cover and of the steering wheel as well as the comfort to the hand or hands grasping the cover. Moreover, the lace 7 can be applied in a time-saving operation and in a manner and to the extent desired by the manufacturer or by the buyer of the vehicle. The person applying the lace 7 can employ a rudimentary tool, e.g., a needle having a simple hook at its working ends and capable of drawing the lace through the eyelets which are formed by the stitches 3. When the lace is tightened, the two rows of stitches 3 are or can be immediately adjacent each other so that the marginal portions 1a, 1b reduce the width of the slot 6 to zero and the body 1 totally confines the peripheral portion of the steering wheel 2. The material of the lace 7 can but need not be the same as that of the body 1. It is normally desirable that the material of the lace 7 exhibit a certain amount of elasticity.

The improved cover can be used on the steering wheels of road vehicles as well as on steering means of motor boats and other types of conveyances.

An important advantage of the cover is its simplicity. In addition, the cover is of eye-pleasing appearance and can be conveniently and reliably held by the hand or hands of the operator. In addition, the useful life of the cover is surprisingly long because the described mode of applying the lace 7 does not necessitate the making of large holes (i.e., removal of material from or the making of slits) in the material of the body 1. The manner in which the lace 7 is applied to keep the marginal portions 1a and 1b close to each other can be selected at will, i.e., the conversion of the lace into a zig-zag formation is but one of many modes of coupling the lace with the stitches 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A tubular cover, particularly for the steering wheel of a vehicle, comprising a substantially annular body of flexible material, said body having an annular slot and including two marginal portions bounding said slot; rows of stitches provided on said marginal portions and extending along said slot, each of said stitches defining an eyelet; and a lace lacing said marginal portions together and passing through said eyelets.

2. The cover of claim 1, wherein said rows of stitches include long stitches extending in substantial parallelism with the respective marginal portions.

3. The cover of claim 1, wherein at least one of said marginal portions has two overlapping layers which are integral with one another adjacent said slot.

4. The cover of claim 1, wherein said annular body has a maximum-diameter portion and a minimum-diameter portion, said slot being provided in the region of said minimum-diameter portion.

5. The cover of claim 1, wherein said lace has mutually inclined portions substantially in a zig-zag formation.

6. The cover of claim 1, wherein said lace has an undulate shape.

7. The cover of claim 1, wherein said body contains leather.

8. The cover of claim 1, wherein the material of said lace is the same as that of said body.

9. The cover of claim 1, wherein the width of said slot is at least close to zero.

10. A tubular cover, particularly for the steering wheel of a vehicle, comprising a substantially annular body of flexible material, said body having an annular slot and including two marginal portions bounding said slot, and at least one of said marginal portions having two overlapping layers which are integral with one another adjacent said slot; rows of stitches provided on said marginal portions and extending along said slot; a lace lacing said marginal portions together and interlocked with the stitches of said rows; and additional stitches which connect said layers to each other.

11. The cover of claim 10, wherein said additional stitches form at least one row which is substantially parallel to said slot.

12. A tubular cover, particularly for the steering wheel of a vehicle, comprising a substantially annular body of flexible material, said body having an annular slot and including two marginal portions bounding said slot; rows of stitches provided on said marginal portions and extending along said slot, at least one of said marginal portions including two overlapping layers having portions which are integral with each other adjacent said slot, and the respective row of stitches being disposed in the region of said portions of said layers; and a lace lacing said marginal portions together and interlocked with the stitches of said rows.

* * * * *